United States Patent

Bailey et al.

Patent Number: 6,155,428
Date of Patent: Dec. 5, 2000

[54] VIBRATORY SCREENING MACHINE

[75] Inventors: Arthur Robert Bailey, Sutton Coldfield; George Alexander Burnett, Aberdeen, both of United Kingdom

[73] Assignee: Rig Technology Limited, Aberdeen, United Kingdom

[21] Appl. No.: 09/254,778

[22] PCT Filed: Oct. 15, 1997

[86] PCT No.: PCT/GB97/02839

§ 371 Date: Mar. 10, 1999

§ 102(e) Date: Mar. 10, 1999

[87] PCT Pub. No.: WO98/16328

PCT Pub. Date: Apr. 23, 1998

Related U.S. Application Data

[60] Provisional application No. 60/047,124, May 20, 1997.

[30] Foreign Application Priority Data

Oct. 15, 1996 [GB] United Kingdom ............... 9621463
Nov. 5, 1996 [GB] United Kingdom ............... 9623017

[51] Int. Cl.⁷ ........................................... B07B 1/28
[52] U.S. Cl. ..................... 209/315; 209/317; 209/319
[58] Field of Search ........................... 209/309, 311, 209/315, 317, 319, 325, 326

[56] References Cited

U.S. PATENT DOCUMENTS 5,037,536   8/1991   Koch et al. .................... 209/325
5,265,730  11/1993   Norris .......................... 209/326
5,683,580  11/1997   Young .......................... 209/326

*Primary Examiner*—Donald P. Walsh
*Assistant Examiner*—Brett C. Martin
*Attorney, Agent, or Firm*—Lee, Mann, Smith, McWilliams, Sweeney & Ohlson

[57] ABSTRACT

A vibratory screening machine such as used for separating solid particulate material from drilling mud to allow the latter to be re-used, is described. The general form of the construction is similar to that of the VSM100 shaker machine as supplied by the applicant company, but significant differences in the design and construction of the new unit allow a higher throughput of mud to be accommodated. An upper filtering screen (88) extends generally horizontally and serves to separate out the larger particles from the rest. The slurry which passes down to the lower screen (90) (of finer mesh than the upper screen) is further filtered and a mud-like residue of particulate material slowly accumulates on the lower screen (90) and migrates up the screen—to be discharged at the upper outlet end thereof, while liquid material filters through the screen to be recovered in a sump below. The drive (14, 16) for the machine comprises two pairs of rotating clump weights, mounted with their individual motors on a platform which spans the basket within which the screens are fitted. The two pairs of clump weights occupy a plane which is generally parallel to the upper (horizontal) screen (88), close to the latter, so keeping the center of gravity low, which enhances the vibration characteristics of the system.

18 Claims, 3 Drawing Sheets

ELEVATION

SECTIONAL VIEW

PLAN VIEW

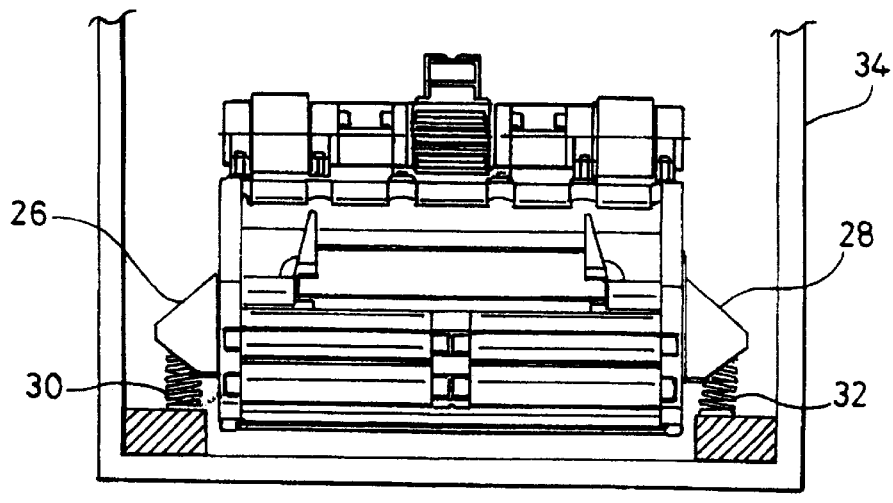
Fig. 4 END ELEVATION
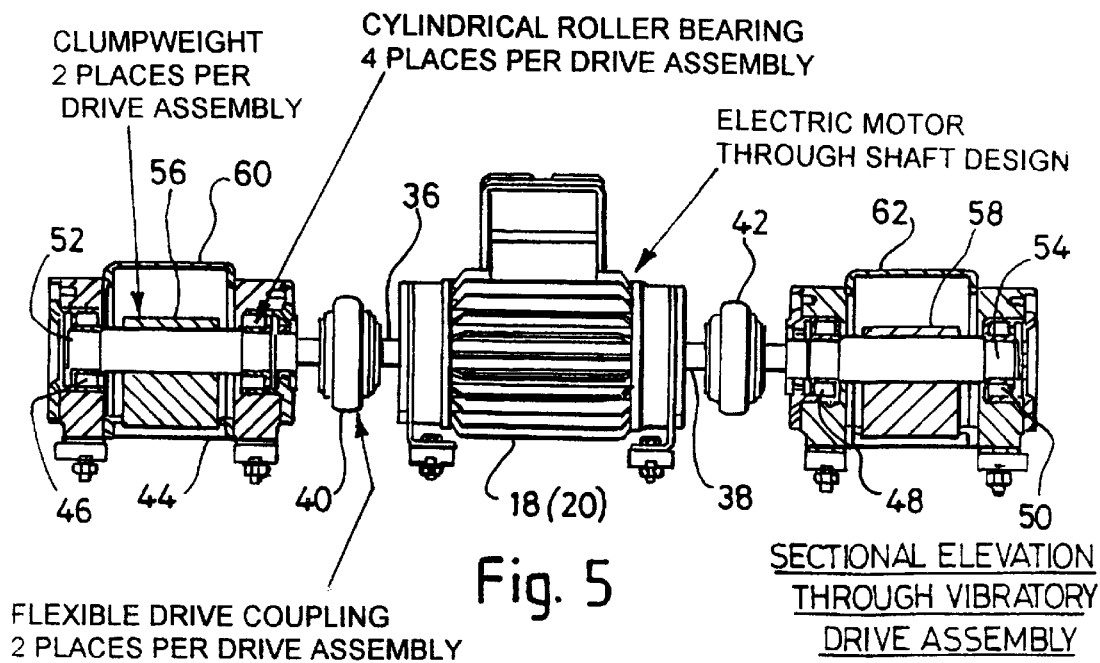
Fig. 5 SECTIONAL ELEVATION THROUGH VIBRATORY DRIVE ASSEMBLY

MEAN OPERATIONAL

50% CAPACITY

100% CAPACITY

VIBRATORY SCREENING MACHINE

This application is a 371 of PCT/GB97/02839, filed Oct. 15, 1997 and claims benefit of provisional application Ser. No. 60/047,124, filed May 20, 1997.

FIELD OF THE INVENTION

This invention relates to vibratory screening machines such as shale shakers used to separate mixtures of solids and liquids into the separate components such as mixtures which result from drilling of a bore hole or tunnel when a drilling fluid is used. Separation of the components permits re-use of the drilling fluid.

BACKGROUND TO THE INVENTION

There are many examples of such machines which essentially comprise a rigid supporting framework within which is resiliently mounted a box or basket containing one or more mesh screens onto which the mixture of solids and liquids is poured. To assist in the sieving action it is known to vibrate the box or basket so that the solid matter on the mesh screens is itself caused to vibrate. This causes clumps of fine material to break up, and if appropriate, pass through the mesh, together with the liquids, and for larger pieces of material which cannot pass through a mesh to migrate over the surface of the mesh to form part of the solids output of the machine.

By using a coarse mesh screen followed by a fine mesh screen so the process of screening is split into two steps in which liquid and fines (small solid particles) pass through the coarse mesh leaving the larger solid material thereon, and essentially the liquid alone is able to pass through the very fine mesh screen leaving the fines to be discharged from the second screen.

U.S. Pat. No. 4,167,478 describes a modular screening machine having at least one screen for separating particulate material according to size in which the screen box is driven so as to describe an elliptical movement at one end and a substantially rectilinear oscillatory movement at the other end.

U.S. Pat. No. 4,340,469 also describes a vibrating screening apparatus containing two screens which are vertically spaced above and below two independently rotatable shafts containing unbalanced weights so that when rotated the screen assembly is caused to move in a generally elliptical path. By choosing the position of the two shaft axes relative to the centre of gravity of the assembly, a rocking movement is introduced at the infeed end of the assembly.

U.S. Pat. No. 5,265,730 describes a further arrangement in which rotary eccentric vibrators are mounted outboard of the machine but act on the screen basket in such a way as to introduce an appropriate shaking movement.

In such machines the objective is twofold. On the one hand the material has to be vibrated so as to separate liquid from solids as far as possible, and to separate small solids from larger solids particularly where a degree of adhesion can exist as a result of the inherent characteristics of the materials concerned. On the other hand as soon as the liquid and solid separation has occurred, it is desirable to remove the solid material from the screens as quickly as possible to make way for further material which is usually desirably delivered for processing on a continuous basis.

Generally movement of solid material off the screen is achieved by incorporating into the motion a backwards and forwards component, as is known in the field of conveyors. This will cause particulate material to migrate along the length of a conveyor in response to an appropriate shaking movement. A drive for such a conveyor is described in U.S. Pat. No. 4,212,731 which also utilises two counter-rotating eccentric weights to generate the forces necessary to introduce conveyance of particulate material along the surface of the conveyor illustrated therein.

Whereas the rapid removal of solid material from the screen is obviously advantageous where a high throughput is required, if the rate of removal is too high the migrating solids and fines may carry too much of the liquid phase.

Whilst it has been found that improved efficiency, both in terms of screening and throughput, can be achieved using two screens, a first having a relatively coarse mesh and a second having a relatively fine mesh as aforesaid, the actual movement of each of the two screens in order to achieve optimum processing is not necessarily the same for each screen.

It has been proposed to drive the two screens separately so as to achieve optimal movement of each screen. Such an arrangement however introduces additional complexities and cost and whilst it does allow for optimisation of a screening process, is not always desirable.

The present invention seeks to provide a simple and expedient solution by providing an improved vibratory drive and filter basket constructions for a sieve particularly a shale shaker as aforesaid, to obtain a high consistency in the ratio of solids transported therethrough.

The invention provides an improved form of such a machine which is more suitable for real time control using closed loop feedback systems for optimising filtering and throughput.

The invention also provides an improved shale shaker which can be used as a basic unit or in conjunction with other similar units to provide for greater throughput, and to permit a reliable and controllable screening of mixtures of solids and liquids, with or without real time closed loop feedback control.

SUMMARY OF THE INVENTION

According to one aspect of the present invention, there is provided a vibratory screening machine having a rigid housing within which is resiliently mounted a rigid screening basket having upper and lower screens mounted therein and drive means for vibrating the basket relative to the housing which comprises a pair of counter-rotating masses mounted for rotation about two spaced apart parallel axes between the sides of the housing, characterised in that:

(1) the axes of the counter-rotating masses both occupy a plane which is substantially parallel to the plane of the upper screen and spaced thereabove, (2) the lower screen forms a continuous ramp which is uniformly sloped upwardly from input end to discharge end and makes an acute angle with the upper screen, and (3) the rotational moment produced by one of the counter-rotating masses is different from that produced by the other, thereby to produce an elliptical motion of the basket relative to the housing.

Preferably each mass comprises a pair of similar weights which are mounted on opposite sides of a drive unit therefor and the drive and weights are located on a bridge which spans the basket.

The position of the assembly of weights in the drives relative to the basket may be selected to advantage so that the angle of the major axis of the elliptical motion, which tends to act through the centre of gravity of the basket, subtends an acute angle in an upward sense relative to the lower inclined screen.

As employed herein the term "screen" is intended to mean a single framed member having a woven wire mesh filtering panel tensioned thereacross or an assembly of such framed members, arranged in edge abutting relation to form a larger area for filtering more material.

It is important to remove as much liquid as possible from the particulates during passage through the machine. Different sized particles tend to require different treatment to achieve this. The inclined lower screen reduces the velocity of the smaller particles so as to increase their dwell time on the screen and resultant dewatering.

By angling the lower screen relative to the upper screen, it has been found that the vibration will not only cause the appropriate rates of movement of the different particulate materials over each of the two screens, so that neither becomes overloaded in use and a multiphase mixture of larger solids, fines and liquid delivered to the upper screen will be separated in a uniform and reliable manner by the two screens, but in particular the time taken by particulate material to travel a given distance along is substantially consistent.

The inclination of the lower screen also provides a hydrostatic head of liquid over the screening surface, which has been found to improve the efficiency of separation and volumetric throughput.

The inclined screen also guarantees that its surface remains flooded with liquid at all times during operation, which is important to ensure efficient separation and transport.

Whilst it has been proposed in earlier designs of machine to provide upper and lower screens, part of the lower screen being parallel to the upper screen and the remaining part thereof extending upwardly as a ramp so as to converge towards the upper screen and create a weir, it has been found in particular that the abrupt change in direction between the two parts of the lower screen has inhibited regular and uniform migration of particulate material from one end of the lower screen to the other. The material handling characteristics of a machine embodying the invention are found to be better than this earlier design of machine, since the lower screen presents a flat inclined plane to the fines which are to migrate thereover.

The lower screen is preferably adapted to be self-clearing so as to reduce the risk of fines becoming permanently lodged between the interstices of the smaller mesh used on the lower screen. To this end the lower screen is preferably one which includes two screen cloths one laid above the other over a rigid frame, and which are pretensioned during manufacture so that the tension in the lower cloth is greater than the tension in the upper cloth. Any component of motion perpendicular to the plane of the two cloths forming the lower screen will tend to cause the less tensioned cloth to rise and fall relative to the lower cloth, and the relative movement, and particularly the impact between the cloths during such vibration, will tend to dislodge particulate material from the cloth and prevent particulate material from lodging and blinding the screen.

The Centre of Action of a pair of counter-rotating masses will normally lie on a straight line joining the centres of rotation. A straight line resultant will be obtained if the two masses are equal in weight and eccentricity and are contra-rotated, as disclosed for example in GB-A-2123520.

The dynamic forces acting on the system will cause the rotation of the two masses to synchronise.

If the centre of gravity and Centre of Action coincide, the Centre of Action will then describe a generally linear motion substantially perpendicular to the plane containing the two parallel axes of rotation.

Where the centre of gravity of the basket and the Centre of Action of the two counter-rotating masses do not coincide the resultant force will act along a line joining the Centre of Gravity to the Centre of Action.

Where the counter-rotating masses produce a straight line resultant force, this will tend to act along a line between the Centre of Action of the two counter rotating masses and the centre of gravity of the basket.

The amplitude of the basket movement from its mean position will be limited inter alia by the stiffness of the basket mounting to the frame. The basket is preferably mounted on four helical springs which support the weight of the basket and are adapted to vibrate substantially freely with small amplitudes of up to a few millimeters relative to the rigid housing.

Since, in accordance with the invention, the rotational moment produced by one of the counter-rotating masses is different from that produced by the other, (either by using a heavier or lighter mass or a different radius of eccentricity, or a combination of both), two effects are noted.

Firstly the position of the Centre of Action will shift from the midpoint between the two centres of rotation nearer to the axis about which the greater rotational moment is produced. The greater disparity of rotational moment, the greater the shift from the mid-position, as described in U.S. Pat. No. 4,212,731.

Secondly it has been observed that the locus of the Centre of Action will now tend to describe an ellipse and the greater the disparity, the larger will be the minor axis of the ellipse.

Since the forces produced by two contra-rotating masses will combine additively when the masses are moving in the same direction, and will combine subtractively when the masses are moving in opposite directions, the major axis of the ellipse will be generally perpendicular to the plane containing the two axes of rotation and the minor axis of the ellipse will be generally parallel to that plane if the centre of gravity of the basket coincides with the Centre of Action.

However if the basket can vibrate and its centre of gravity does not so coincide, then since the resulting force will always act through the centre of gravity of the basket, it will tend to describe an elliptical path with the major axis of the ellipse orientated so as to lie along the line joining the "operational" centre of gravity of the basket to the Centre of Action of the two counter rotating weights.

It will be seen therefore that by varying the rotational moment of one of the counter rotating masses of the drive unit so that it is different from the other, so the pure straight line movement which results if the two rotary moments are equal is converted into an elliptical motion in which the minor axis of the ellipse and therefore the extent by which the motion is no longer straight-line is determined by the disparity between the two rotary moments, as is also the angle of the major axis of the ellipse.

In a preferred example, the basket dead-weight unladen is in the range 1000–1750 Kg, a typical dynamic loading of slurry is in the range 450–700 Kg and a first eccentric weight has a mass of 43 Kg and the centre of gravity of the mass is some 40 mm from the shaft centre line, whilst the second eccentric weight has a mass of 26 Kg and its centre of gravity is some 47 mm from its shaft centre line, and the rotational speed is such as to produce vibration in the range 20–40 Hz, preferably in the range 25–33 Hz.

Preferably opposite sides of the rigid housing are parallel and upright when the machine is mounted for use, and nothing protrudes laterally of the frame rigid housing. Thus the machines can be placed side by side in close proximity to allow outgoing solids and liquids to be collected by troughs/conveyors adjacent the output ends of the side-by-side machines, and the slurry input to the machines can be discharged into one or two or more of the machines, depending on the volume of slurry to be handled and the capability of the machines to handle the input material.

Although reference has been made to the rotation of single eccentric weights about each of the two spaced-apart axes of rotation, it is to be understood that each mass or weight along each axis can be divided into two or more (preferably similar) weights, each eccentrically mounted about the same axis.

The invention also extends to a vibratory screening machine comprising a basket having an inclined screen, drive means for vibrating the basket to cause solid material deposited on the screen to migrate therealong up the incline to the upper discharge end of the screen from which the solid material is discharged, wherein the drive means exerts on the basket a resultant force along a line which passes through or near the centre of gravity of the basket when the latter is unloaded, and wherein the inclination of the screen is such that the centre of gravity of the basket continues to lie on or near the said line for different loadings of the basket.

Other features of the invention are defined in the appended claims.

BRIEF DESCRIPTION OF THE DRAWINGS

The invention will now be described by way of example, with reference to the accompanying drawings in which:

FIG. 4 is an end elevation which also shows the having within which the basket is mounted;

FIG. 5 is a sectional elevation through a vibratory drive assembly (of which there are two in the embodiments shown in FIGS. 1 to 4);

DETAILED DESCRIPTION

Figure 1:
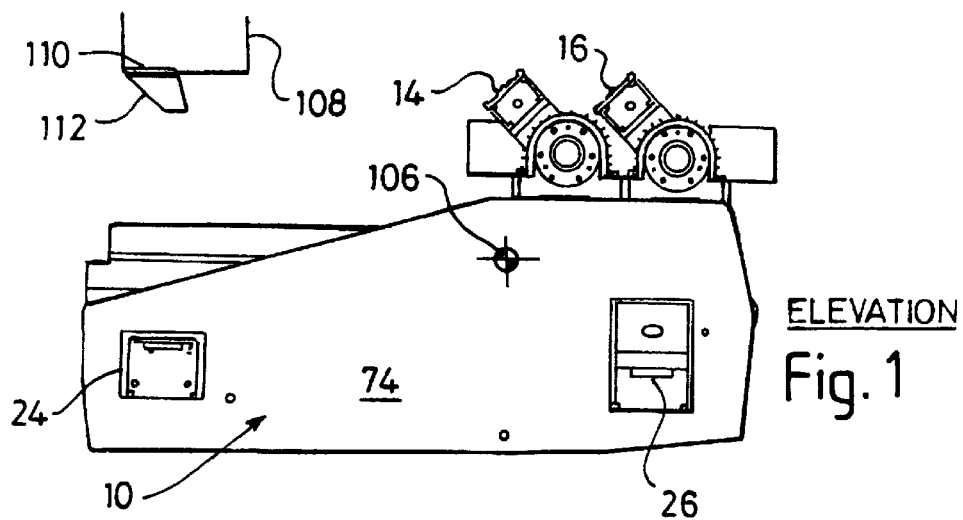
FIG. 1 is a side elevation of the vibratory basket of a shale shaker embodying the invention.
Figure 2:
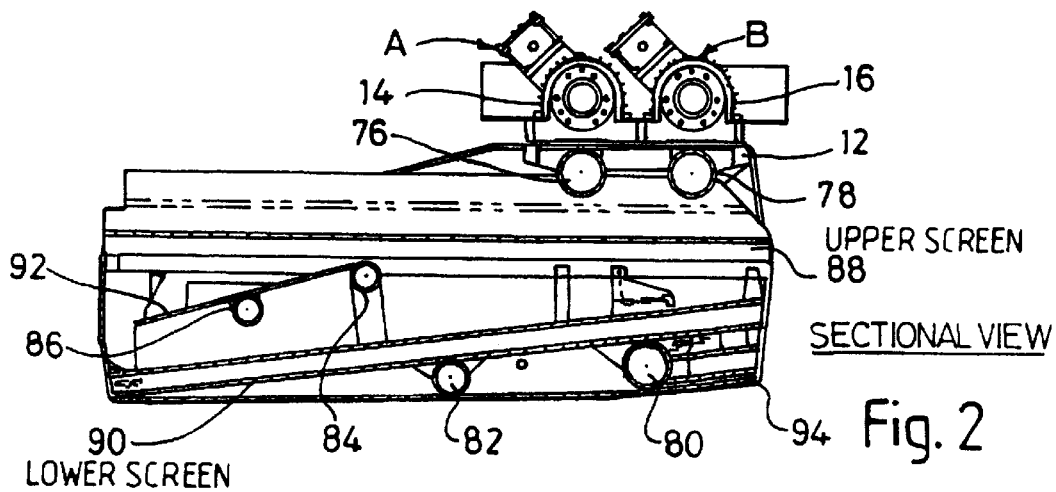
FIG. 2 is a cross-section through the elevation of FIG. 1.
Figure 3:
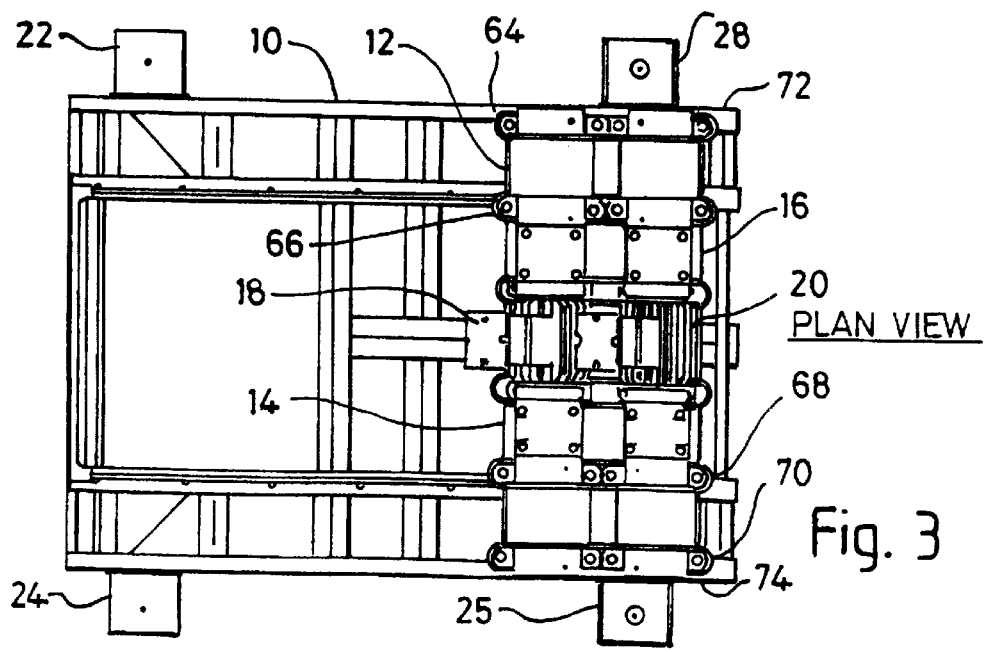
FIG. 3 is a top view of the basket shown in FIG. 1.

Referring to FIGS. 1 to 3 a vibratory basket designated 10 is spanned by a bridge 12 (see FIG. 3) on which are carried two rotational drives 14 and 16.

Each of the drives comprises a central electric motor 18, (20) of so-called through-shaft design, having an output shaft protruding axially therefrom on opposite sides of the motor casing, and two equal eccentric "in phase" clump weights, are mounted on each rotating output shaft, so that rotation of the motor and the clump weights produces a rotating force equivalent to the clump weights and their eccentricity. The drives are shown in more detail in FIG. 5 and will be described more fully with reference thereto.

The basket 10 is supported on helical springs below four brackets 22, 24, 26, 28. Two of the springs can be seen in FIG. 4 and are designated by reference numerals 30 and 32. FIG. 4 also shows the housing 34 within which the basket is carried on the springs and it will be seen that the two sides of the housing 34 are uncluttered and have no protruding elements, so that two or more such housings can be abutted laterally against one another frame, side by side. This allows for variations in material feed rate to be more accommodated, by conveying slurry to one, or two or more units (if more than two units are mounted side by side), depending on the volume of slurry to be processed, by means of a transversely extending duct over the input ends of the units.

FIG. 5 shows in more detail one of the drive units 16, based on the motor 18. The motor is a through shaft motor and an output shaft extends therefrom on both sides of the motor housing at 36 and 38 respectively. Each output shaft is connected to a flexible drive coupling 40, 42 respectively, the output shafts of which are carried in journal bearings 44, 46 (in the case of coupling 40) and 48, 50 (in the case of coupling 42). Each journal bearing typically comprises a cylindrical roller bearing. Mounted on the coupling output shaft 52, 54 are eccentric clump weights 56, 58 respectively. Rotation of the motor 18 causes both clump weights to be similarly rotated and their eccentricity generates a rotating out of balance force as they rotate.

For safety, and protection against erosion, the clump weights and flexible drives are contained within cylindrical housings 60, 62 respectively. The inboard ends of the housing 60, 62 are coupled to the casing of the motor 18 and are closed at their outboard ends.

The housings 60, 62 each have feet (64, 66, 68, 70 in the case of housing 60) by which the housings are secured to the bridge 12.

The basket 10 is formed from two side panels 72, 74 between which extend hollow cylindrical tubes 76, 78, 80, 82, 84 and 86. These are welded to the two opposed side panels 72, 74 and create a lightweight, very strong rigid structure.

Screen supporting rails (not identified in the drawings) support an upper generally horizontal screen 88 and an inclined lower screen 90, which rises in the direction in which particulate material migrates over its surface during vibration, ie from left to right in FIG. 2.

A deflector plate or intermediate screen 92 extends over the lower inclined screen below the region onto which slurry (drilling mud) is poured.

A collector 94 is located below the discharge end 96 of the lower conveyor.

By mounting both the two clump weights and their motor drives just above the upper screen, so the centre of gravity (shown in FIG. 1) is considerably lower than if the left hand drive 16 is mounted above the position shown in FIG. 2, so that the line joining the axes of the two motors is parallel to the inclined lower screen and which is where it has normally been considered that it should be mounted.

In use the clump weights of drive 14 are rotated in the opposite sense to the clump weights of drive 16.

It has been found in practice that different conveyance characteristics can be produced by different rotations, and in the example shown, if the rotation of the left hand drive 14 in FIG. 1 is clockwise, and the rotation of the right hand drive 16 is counter-clockwise, this produces a more consistent and steadier migration of particulates along the screens than if the directions of rotation are reversed.

The motors 18 and 20 may be electric motors, but in combinations where flammable gases or liquid are involved, the motors are more preferably hydraulic or pneumatically powered.

The springs such as 30, 32 may be replaced by blocks of rubber or plastics, or rubber and plastics composite material.

The screens for filtering fluids from solids may be formed from rigid metal, or plastics, or metal reinforced plastic frames having stretched and tensioned and bonded thereto woven wire cloths. Typically each screen has two layers of wirecloth affixed thereto, and the lower cloth has a coarser mesh and higher mesh tension than the upper cloth. Typically the upper cloth has a mesh size in the range 10–80 mesh while the lower cloth has a mesh size in the range 50–350 mesh.

Although not shown, each of the screens 88 and 90 (as identified in FIG. 2) may be formed from two or four similar screens arranged in edge abutting relation and sealed against the ingress of liquid around or between their frames. An inflatable seal may be provided to secure and seal the frame in place against rails (not shown) on the underside thereof.

The centre of gravity of the basket 10 in FIG. 1 is shown at 106 in FIG. 1, and the instantaneous resultant force produced by the combination of the two rotating pairs of clump weights acts through that point.

Where two or more units such as shown in FIGS. 1 to 4 are mounted side by side, with the side walls of their housings 34 in abutting relation, the feed to the units may comprise a manifold 108 which extends horizontally over the left hand ends (as viewed in FIG. 1) of all of the baskets (10), with flow control means 110 selectively allowing or preventing slurry (eg drilling mud) to flow via ducts 112 onto the left hand (input) end of the upper screen 88 (see FIG. 2) of some or all of the shakers, as required.

A sump (not shown) below the units collects the filtered liquid material containing fines (which cannot be separated), while solids filtered therefrom and left on the upper and lower screens migrate from left to right to exit off the right hand end of the lower screen, in particular, for collection on a conveyor or in another sump (not shown) mounted along the front of the units.

A control unit (not shown) for sensing the volume flow of material to the units and opening and shutting ducts such as 112 and causing the units to operate as required, may be provided, linked to flow sensors and to controls for opening and closing the ducts and turning the shakers on and off.

A unit as shown in FIGS. 1 to 5 of the drawings is of particular use in separating solid particulate material from drilling muds recovered from down-hole oil and gas well drilling operations.

Filtering screens for a unit as aforesaid may be of the type produced by United Wire Ltd of Edinburgh, Scotland, UK.

Figure 6:
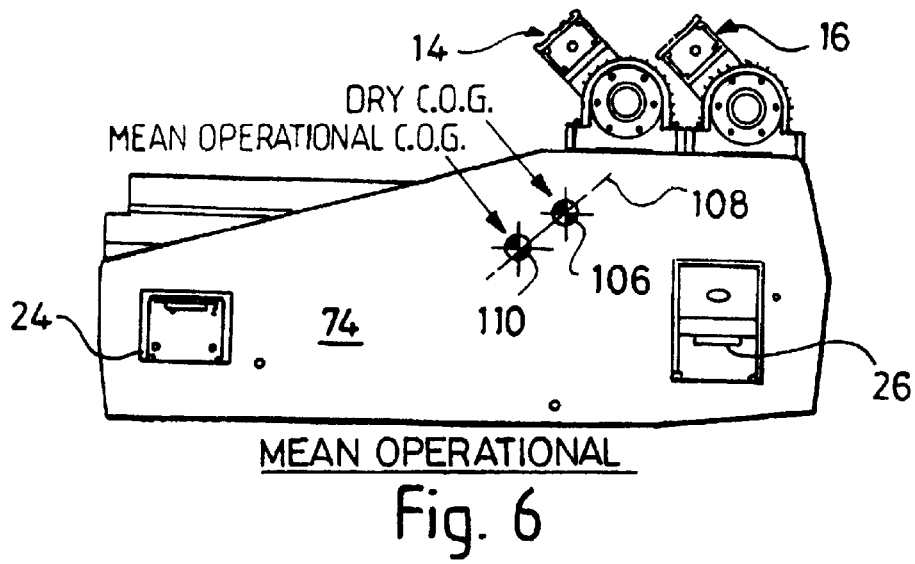
FIG. 6 is a side view, corresponding to FIG. 1, of the basket, showing the centre of gravity of the basket when unloaded and the mean centre of gravity of the basket when under normal operating load (an average 70% of maximum load)

With reference to FIG. 6, the position 106 is that of the centre of gravity of the basket 10 when no fluids and cuttings are being carried by the screens of the machine. This position lies on a line 108 which, if extrapolated, will pass through the Centre of Action of the weights.

The Centre of Action lies on a line (not shown) joining the two axes of rotation of the weights. The machine is so configured that the net force exerted by the weights gives rise to no turning moments being exerted on the basket 10, and this requirement places constraints on the relative sizes of the weights, their effective radii of rotation, and hence the position of the Centre of Action, which can be expressed by the formula $$\frac{m_1 r_1}{m_2 r_2} = \frac{b}{a}$$

where $m_1 \, r_1$ is the product of the mass and effective radius of rotation of the clump weights of one drive $m_2 \, r_2$ is the corresponding product for the other drive a is the distance of the Centre of Action from the axis of the weights of said drive; and b is the distance of the Centre of Action from the axis of the weights of the other drive.

The optimum values for the above parameters are believed to be as follows:

$m_1$=33.5 Kg; $m_2$=25.4 Kg; $r_1$=0.046 m; $r_2$=0.042 m and the masses are stated at a speed in the range 1500–2000 rpm. The resultant elliptical path of the basket 10 has a major radius of 3.3 mm and a minor radius of 0.6 mm.

Of course, in use, the Centre of Gravity of the basket will be affected by the mass of fluid and cuttings on the screens. Reference numeral 110 denotes the position of the mean operational Centre of Gravity of the basket.

Figure 7:
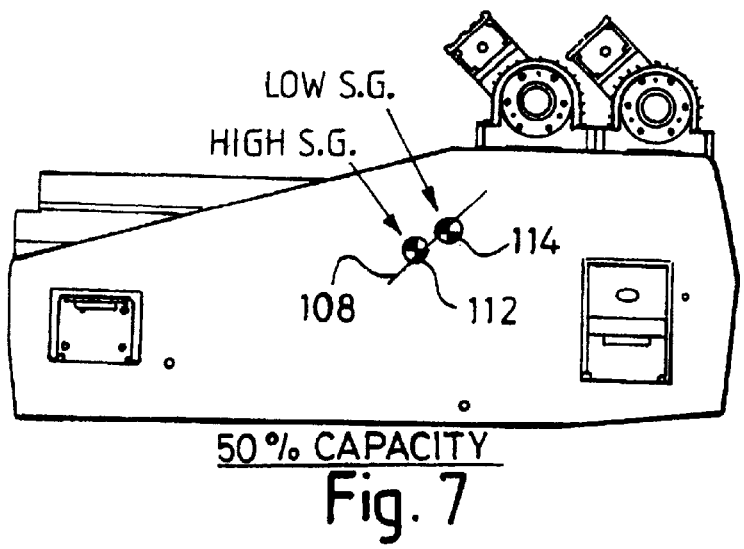
FIG. 7 corresponds to FIG. 6, and shows the centres of gravity when the basket is loaded, to half capacity, with high or low specific gravity fluids.
Figure 8:
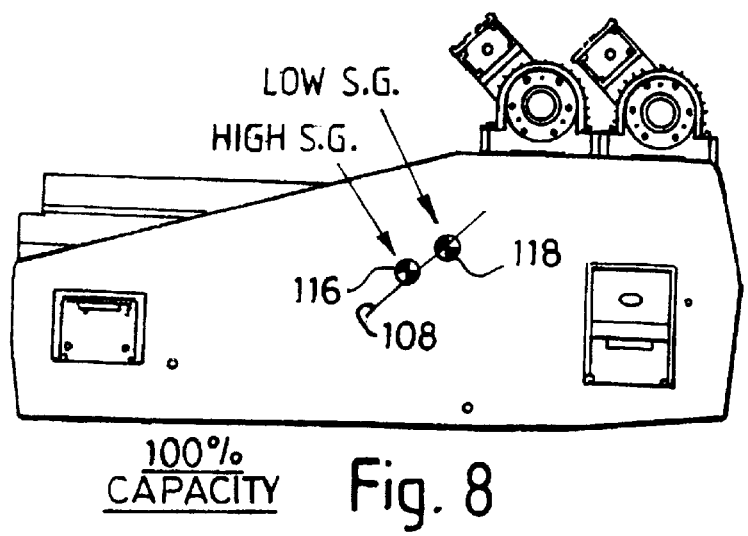
FIG. 8 is a view corresponding to FIG. 7, and showing the centres of gravity when the basket is fully loaded with a high or low specific gravity fluid.

In FIG. 7, reference numerals 112 and 114 denote the positions of the Centre of Gravity when the basket is loaded, to half its maximum capacity, respectively with examples of high and low Specific Gravity fluids, whilst the positions of the Centre of Gravity when the basket is fully loaded with high and low density fluids are respectively indicated by numerals 116 and 118 in FIG. 8.

It will be seen that all of the positions 110, 112, 114, 116 and 118 lie on or near the line 108, as a result of the inclination of the lower screen. Thus, the varying of the loads on the basket has a minimal effect on the angular relationship between the Centre of Gravity and the Centre of Action.

What is claimed is:

1. A vibratory screening machine having a rigid housing within which is resiliently mounted a rigid screening basket having upper and lower screens mounted therein, the upper screen being of a coarser mesh than the lower, and drive means for vibrating the basket relative to the housing which comprises a pair of counter-rotating masses mounted for rotation about two spaced apart parallel axes between the sides of the basket, wherein:

(1) the spacing between the two spaced apart parallel axes or their precise positioning relative to the mean operational centre of gravity of the basket is selected so that the resultant force is of the desired type, and makes a desired angle relative to the screens;

(2) the axes of the counter-rotating masses both occupy a plane which is substantially parallel to the plane of the upper screen and spaced thereabove, to keep the centre of gravity low;

(3) the lower screen forms a continuous ramp which is uniformly sloped upwardly from input end to discharge end and makes an acute angle with the upper screen, and (4) the rotational moment produced by one of the counter-rotating weights is different from that produced by the other, thereby to produce an elliptical motion of the basket relative to the housing.

2. A vibratory screening machine as claimed in claim 1, wherein each mass comprises a pair of similar weights which are mounted on opposite sides of the drive unit therefor, and the drive and weights are located on a bridge which spans the basket.

3. A vibratory screening machine as claimed in claim 2, wherein the bridge is located beyond the midway point measured along the length of the basket nearer to the discharge end than the input end thereof.

4. A vibratory screening machine as claimed in claim 1 wherein the position of the assembly of weights in the drives relative to the basket is such that the angle of the major axis of the elliptical motion produced by the counter-rotating masses tends to pass through the centre of gravity of the basket and to subtend an acute angle in an upward sense relative to the lower inclined screen.

5. A vibratory screening machine as claimed in claim 1 wherein in use the upper screen of coarser mesh is substantially horizontal.

6. A vibratory screening machine as claimed in claim 1 wherein the acute angle between the plane of the lower screen and that of the upper screen lies between 2° and 30°.

7. A vibratory screening machine as claimed in claim 1, wherein the lower screen is adapted to be self-cleaning so as to reduce the risk of fines becoming permanently lodged between the interstices of the smaller mesh of the lower screen.

8. A vibratory screening machine as claimed in claim 7, wherein the lower screen comprises two screen cloths, one laid above the other over a rigid frame, which are pre-tensioned during manufacture so that the tension in the lower cloth is greater than the tension in the upper cloth.

9. A vibratory screening machine as claimed in claim 8, wherein the cloths are formed from woven wire having different mesh sizes and the woven wire cloths are adhesively bonded at least around their periphery to rigid frames by which the screen is mounted within the shaker basket.

10. A vibratory screening machine as claimed in claim 1 wherein both the upper and lower screens are removable from the basket.

11. A vibratory screening machine as claimed in claim 1 wherein the screens are removable from the end of the basket over which the solids and fines are discharged in use.

12. A vibratory screening machine as claimed in claim 1 wherein the basket is mounted on four helical springs which support the weight of the basket and are adapted to vibrate substantially freely with small amplitudes up to a few millimeters relative to the rigid housing.

13. A vibratory screening machine as claimed in claim 1 wherein opposite sides of the rigid housing are parallel and upright when the machine is mounted for use and nothing protrudes laterally of the rigid housing.

14. A vibratory screening machine as claimed in claim 1 wherein each said drive means comprises a motor mounted centrally of a bridge with an output shaft extending axially in both directions therefrom and weights are mounted eccentrically on the two output shafts on opposite sides of each motor.

15. A vibratory screening machine as claimed in claim 14, wherein bearings are provided to support the output shafts between the motors and the eccentrically rotating masses, and further bearings are provided outboard of the eccentrically mounted masses.

16. A vibratory screening machine as claimed in claim 1 wherein flexible couplings are provided between the drives and the counter-rotating eccentric masses so that forces generated by the rotating eccentrically mounted masses are not transmitted to the motor bearings.

17. A vibratory screening machine comprising a basket having an inclined screen, drive means for vibrating the basket to cause solid material deposited on the screen to migrate there along up the incline to the upper discharge end of the screen from which the solid material is discharged, wherein the drive means comprises a pair of counter-rotating masses respectively mounted for rotation about two spaced apart parallel axes between the sides of the basket, whereby the drive means exerts on the basket a resultant force along a line which passes through or near the centre of gravity of the basket when the latter is unloaded, and wherein the inclination of the screen is such that the centre of gravity of the basket continues to lie on or near the said line for different loadings of the basket.

18. A vibratory screening machine as claimed in claim 17, wherein the counter-rotating masses comprise two pairs of weights and including two drives therefor, each drive being located centrally between its associated pair of masses, each pair of masses being mounted for eccentric rotation about its associated drive axis, the masses being counter-rotated by their respective drives, and wherein the said line along which the resultant force acts joins the centre of gravity of the basket under normal loading conditions to the centre of action of the two pairs of masses.

* * * * *